United States Patent
Gut

(10) Patent No.: US 8,931,617 B2
(45) Date of Patent: Jan. 13, 2015

(54) DEVICE AND METHOD FOR REMOVING OBJECTS FROM A MOVING TRANSPORT DEVICE

(71) Applicant: KRONES Aktiengesellschaft, Neutraubling (DE)

(72) Inventor: Thorsten Gut, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/963,551

(22) Filed: Aug. 9, 2013

(65) Prior Publication Data
US 2013/0327612 A1 Dec. 12, 2013

Related U.S. Application Data

(62) Division of application No. 12/798,548, filed on Apr. 6, 2010.

(30) Foreign Application Priority Data

Apr. 29, 2009 (DE) .......... 10 2009 003 847

(51) Int. Cl.
*B65G 47/10* (2006.01)
*B65G 47/46* (2006.01)
*B07C 5/34* (2006.01)
*B65G 47/71* (2006.01)
*B65G 47/82* (2006.01)

(52) U.S. Cl.
CPC ............. *B65G 47/46* (2013.01); *B07C 5/3408* (2013.01); *B65G 47/71* (2013.01); *B65G 47/82* (2013.01)
USPC ................. 198/370.02; 198/370.07; 198/890; 198/736

(58) Field of Classification Search
USPC ........... 198/370.02, 370.07, 890, 736; 15/1, 4
See application file for complete search history.

(56) References Cited

U.S. PATENT DOCUMENTS

| | | | |
|---|---|---|---|
| 2,966,251 A | 12/1960 | Nussbaum | |
| 3,955,678 A | 5/1976 | Moyer | |
| 4,442,932 A | 4/1984 | Sashiki et al. | |
| 4,643,291 A | 2/1987 | Counter | |
| 4,910,406 A * | 3/1990 | Craig et al. | 250/372 |
| 5,040,665 A | 8/1991 | Suzuki | |
| 5,352,611 A * | 10/1994 | Fine et al. | 436/43 |
| 5,571,978 A * | 11/1996 | Gysi et al. | 73/865.8 |
| 5,591,899 A * | 1/1997 | Griesbeck | 73/41 |
| 5,733,783 A * | 3/1998 | Fine et al. | 436/43 |
| 5,794,790 A | 8/1998 | Bonnet | |
| 5,971,132 A | 10/1999 | Bonnet | |
| 6,264,042 B1 | 7/2001 | Cossey et al. | |
| 6,755,298 B1 | 6/2004 | Heuft et al. | |
| 7,086,519 B2 | 8/2006 | Veit et al. | |
| 2003/0112430 A1* | 6/2003 | Lindner | 356/239.4 |
| 2007/0150383 A1* | 6/2007 | Shakes et al. | 705/29 |

FOREIGN PATENT DOCUMENTS

| | | |
|---|---|---|
| CN | 1328523 | 12/2001 |
| DE | 40 21 330 | 1/1992 |

(Continued)

*Primary Examiner* — Joseph Dillon, Jr.
(74) *Attorney, Agent, or Firm* — Davidson, Davidson & Kappel, LLC

(57) ABSTRACT

A device and a method for removing objects from a moving transport device having objects standing in a row thereon, including a removing device for pushing and thus removing selected objects at a right angle or any other angle with respect to the direction of travel of the transport device. The removing device is formed by a position-controlled linear actuator.

20 Claims, 1 Drawing Sheet

(56) References Cited

FOREIGN PATENT DOCUMENTS

| | | |
|---|---|---|
| DE | 29604683 | 5/1996 |
| DE | 19 532 306 | 5/1997 |
| DE | 10 2005 021109 | 11/2006 |
| DE | 20 2007 013933 | 5/2008 |
| EP | 0 704 584 A2 | 3/1997 |
| GB | 2 174 667 | 11/1986 |
| GB | 22 46 216 | 1/1992 |
| WO | WO 02/26602 | 4/2002 |

* cited by examiner

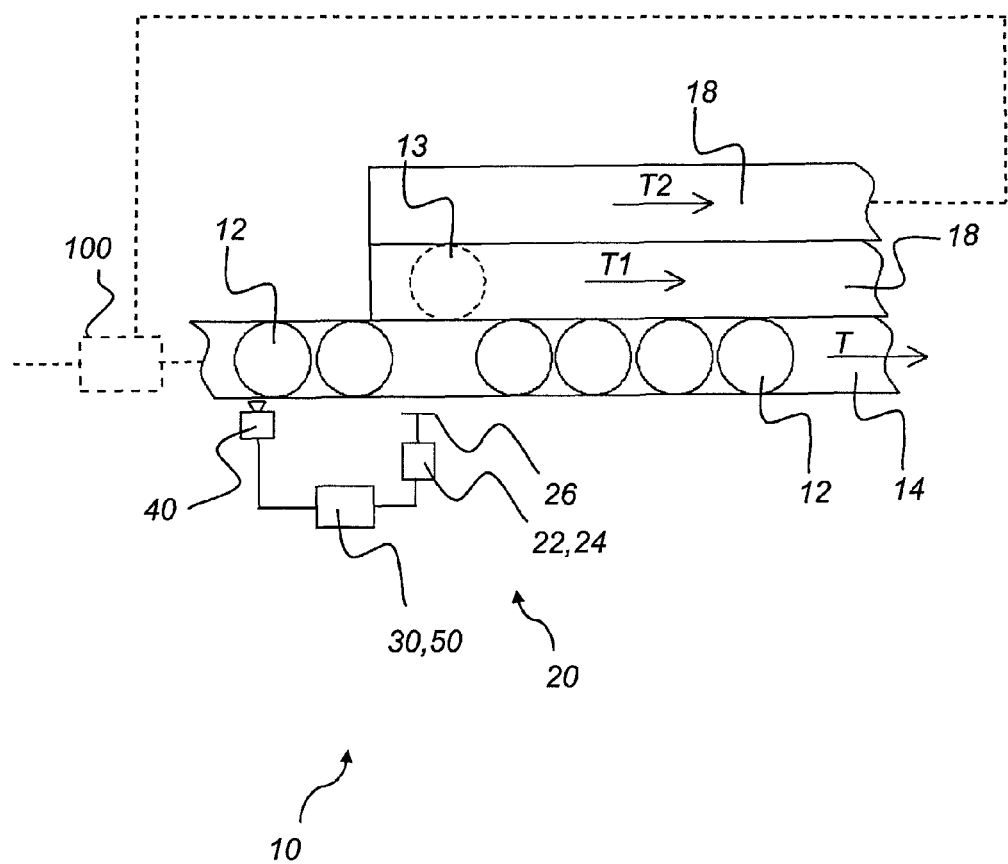

DEVICE AND METHOD FOR REMOVING OBJECTS FROM A MOVING TRANSPORT DEVICE

This is a Divisional of U.S. patent application Ser. No. 12/798,548, filed Apr. 6, 2010 and claims the benefits of German Patent Application DE 2009 003 847.7, filed Apr. 29, 2009, both applications are hereby incorporated by reference herein.

The invention relates to a device for removing objects from a moving transport means. The invention further relates to a corresponding method for removing objects from a moving transport means.

BACKGROUND

In bottle filling plants and transport means for bottles, measures need to be taken to separate flawed and/or damaged bottles from a continuous conveyed stream. A variety of systems for removing flawed bottles from a continuous stream of bottles are known. They use pushing means, so-called "pushers", which push the flawed bottles in a lateral direction out of the stream of bottles. These pushers are normally operated with compressed air, which has the unwanted effect that, if there is a change in the bottles transported in the system, the operating pressure has to be adjusted for the new type of bottle; the position with respect to the conveyor belt also has to be corrected manually.

This concept has been known for a long time and is considered prior art. However, it is disadvantageous in that it strongly limits the modulation capability and the controllability of these pneumatic pushing means. The control parameters and/or the trigger times and/or the position of the pusher must be manually adjusted to any changed circumstances, such as different bottle sizes and/or fill levels of the transported bottles.

SUMMARY OF THE INVENTION

It is an object of the present invention to provide a removing system allowing better and faster adjustment of the control parameters for the removing means to varying requirements.

The present invention provides a system for removing objects particularly comprising beverage containers, bottles or the like. This removal may be a removal from a moving transport device with objects standing in a row thereon. Furthermore, a removing device serves to push and thus remove the selected objects. The selected objects may include bottles, containers or the like that are flawed or soiled.

The process of removing selected objects may be performed at a right angle or at any other angle with respect to the direction of travel of the transport device. The removing device depends on a main control distributing the selected objects to one or more lines.

According to the present invention, the removing device is formed by a position-controlled linear actuator, which is designed as a pusher and pushes the selected objects in a lateral direction from a conveyor onto a single or one of several removing lines. A removing line may be a transport belt returning the objects to a cleaning machine. The objects are returned, for example, if the objects have been found to be soiled. A further removing line may, for example, be designed as a transport belt delivering the objects to a container positioned below the transport belt. This container may, for example, serve to collect all objects no longer suitable for further processing. In addition, the removing lines may include elimination chutes.

The position-controlled linear actuator is characterized by uniform power transmission and power generation. In comparison to gear-based mechanisms, it thus has advantages regarding positioning accuracy and dynamics. Furthermore, the position-controlled linear actuator includes an electric linear motor which has a built-in, integrated position control and may be parameterized by a guiding system. This means that the linear actuator or the electric linear motor is coupled to a controller that allows presetting various movement parameters of the actuator.

The force exerted by the removing device, with which the selected objects are pushed from the transport device, depends on the resistance expected from the selected objects and/or their weight. The force applied for pushing may differ from object to object and must be adjusted correspondingly. By way of example, empty bottle inspection includes removing soiled or damaged objects from the transport device. The soiled objects must be treated with the energy required for their empty weight, whereas objects with remnants, such as remaining cleaning fluid, have about twice this weight so that they must be removed using more force. The situation is similar with filled objects. In a fill level monitor arranged downstream of a filling machine, objects that are unsatisfactorily filled are removed. Again, half-filled objects have less weight than objects nearly reaching the ideal fill level.

Basically, the ideal parameters for the removal of standing objects may be preset for the objects. For example, the controller allows controlling total travel, speed of travel and/or acceleration of the actuator for removing the objects as desired. The necessary parameters are previously input in the controller. However, the control parameters of the actuator may optionally be varied during movement. In addition, an absolute zero position of the actuator with respect to the belt and with respect to the objects may be preset.

For setting the actuator acceleration, various sets of parameters may be created in the controller. These sets of parameters depend on the state of the object; for example, a first set of parameters may be fill level monitoring. If the fill level monitor detects insufficient or excess filling of an object, the object is to be removed with the help of the removing device. A further set of parameters might allow the removing device to remove empty or insufficiently filled objects according to what is defined in the corresponding set of parameters.

The required parameters for the fill level monitor may be determined by a sensor that is coupled to the controller and outputs a signal to the removing device if a set of parameters is triggered. In addition, the sensor may serve to detect parameters concerning weight and/or center of gravity of the objects, and may also output the values to the controller. The sensor may, for example, be implemented as a camera or any other optical detector.

The camera, as sensor, allows simple monitoring of the fill level for removal purposes. The filling of the objects is determined. If the filling state of an object is full, half-full or empty, the object is removed according to the applied set of parameters. These sets of parameters are preset in the controller for each type.

The linear actuator may be initialized prior to start-up and/or on the fly; this means that, if there is a following error in the linear motor, the position of the motor may be adjusted during operation. In this context, following error means an error caused by speed between target position and actual position. This means that an actual value of the pusher lags behind the target position value. This following error may, for example, be detected due to a deviation and/or irregularity of an actual position value curve in a control diagram showing actual values and target values. Increasing the speed amplification factor decreases the following error.

The positional adjustment of the linear actuator may be controlled by the controller, depending on the detected sensor values, with respect to object parameters depending on weight and/or center of gravity and/or size. If a new type of object is supplied to the transport device, the horizontal position of the actuator relative to the object is automatically adjusted.

In addition to the device, the invention also includes a method for removing objects. This removal is performed in a moving transport device with objects standing in a row thereon. For their removal, the selected objects are pushed at a right angle or at any other angle with respect to the direction of travel of the transport device by a removing device. The removal of the selected objects is thus performed with the help of a position-controlled linear actuator formed by a position-controlled electric linear motor. This linear actuator or electric linear motor is driven by a controller for presetting various movement parameters of the actuator.

The actuator is controlled by the controller, which controls total travel, speed of travel and/or acceleration. The control parameters may be varied during the movement of the actuator. For example, the actuator is driven depending on parameters concerning weight and/or center of gravity of the objects, and the linear actuator may also be initialized prior to start-up and/or on the fly.

By the detection of a following error of the linear actuator, its position may be adjusted during operation. The positional adjustment is controlled by the controller, depending on the detected sensor values, with respect to object parameters depending on weight and/or center of gravity and/or size.

In the method for removing objects, the objects comprise beverage containers and/or bottles that are pushed in a lateral direction from a conveyor onto one or more removing lines by means of the position-controlled linear actuator designed as a pusher.

Further features, objects and advantages of the present invention will become apparent from the following detailed description of a preferred embodiment of the invention which serves as a non-limiting example and refers to the accompanying drawing.

BRIEF DESCRIPTION OF THE DRAWINGS

The only FIGURE, FIG. 1, shows a schematic view of a device for removing objects.

DETAILED DESCRIPTION

The schematic view of FIG. 1 shows an embodiment of an inventive device 10 for removing objects 12. These objects 12 may particularly comprise bottles or the like. In the present embodiment, the device 10 consists of a total of three transport belts 14, 18. One transport device 14 operates so that the objects 12 will pass a sensor 40 in an upright position. The sensor 40 recognizes the type of object 12 and sends the data of this type to a controller 30.

If, during fill level monitoring, the sensor 40 detects that the objects 12 are not full, but only half-full, a signal is transmitted to the removing device 20. This signal transmission is performed with the help of the controller 30, which is operatively connected to a linear actuator 22. The linear actuator 22 comprises a position-controlled electric linear motor 24. The various movement parameters of the linear actuator 22 are previously stored so that the linear motor 24 may execute the control commands transmitted from the controller 30.

After the signal has been transmitted from the controller 30, the flawed objects 12 are removed with the help of a pusher 26. The pusher 26 is driven with the help of the position-controlled linear actuator 22 and may remove the flawed objects 13 via one or more removing lines 18 arranged next to each other. In addition to the actual transport device 14 transporting the objects 12 in the direction of further processing T, the removing lines 18 arranged next thereto transport the flawed objects 13 either to their disposal T1 or to a return transport belt T2.

The return transport belt T2 receives removed, flawed objects 13 that are to be returned, for example, to a cleaning machine 100. In FIG. 1, this return transport belt T2 is the second removing line 18 arranged next to the transport belt for disposal T1, which, in turn, is arranged next to the transport device 14. This parallel arrangement of the removing lines 18 is to be considered as only one of several possible embodiments. It is also conceivable that there are more than two or only one removing line 18.

Basically, it is useful to preset the ideal parameters for upright removal in the controller 30 when introducing objects 12. For example, various sets of parameters depending on the bottle state may be defined for the acceleration in the control means 30. These parameters are stored for each type. Since different object or bottle sizes may have different positions of the center of gravity, the settings of the pusher 26 must be correspondingly adjusted to ensure failure-free removal. It may also be necessary to use other control parameters for moving heavier objects to the removing lines 18 than those used for lighter objects. In the context of detecting the filling state by means of sensor 40, these parameters may have to yield to further parameters focusing on weight and/or center of gravity.

Only the use of an electric linear motor 24 as pusher actuator allows a tailored transfer of the flawed objects 13 to one of the desired removing lines 18. In contrast thereto, the pushers used in prior art, which are driven pneumatically, only allow relatively rough positioning during removal, because there is no position-controlled actuator.

The invention is not limited to the above embodiments. Instead, a variety of alternatives and modifications is contemplated that make use of the inventive idea and thus also fall within the scope of the invention.

List of Reference Numerals
- 10 device
- 12 objects
- 13 flawed objects
- 14 transport device
- 18 removing lines
- 20 removing device
- 22 linear actuator
- 24 linear motor
- 26 pusher
- 30 controller
- 40 sensor
- T transport belt for further processing
- T1 transport belt for disposal
- T2 return transport belt
- 100 Cleaning Machine

What is claimed is:
1. A device for removing objects from a moving transport device having objects standing in a row thereon, comprising:

at least one removing line;

a sensor determining if the objects are soiled or are no longer suitable for further processing; and a removing device for pushing and thus removing selected objects in a lateral direction with respect to a direction of travel of the transport device, the transport device being a conveyor, the removing device including a position-controlled linear actuator and a pusher to push the selected objects in the lateral direction from the conveyor onto the at least one removing line as a function of an input from the sensor, the at least one removing line including a first removing line returning the objects to a cleaning machine if the objects are soiled and a second removing line serving to collect all objects no longer suitable for further processing.

2. The device as recited in claim 1 wherein the linear actuator includes a position-controlled electric linear motor.

3. The device as recited in claim 1 wherein the linear actuator is coupled to a controller allowing presetting of various movement parameters of the linear actuator.

4. The device as recited in claim 3 wherein the controller controls total travel, speed of travel and/or acceleration of the linear actuator.

5. The device as recited in claim 3 wherein the controller varies the movement parameters of the linear actuator during movement of the linear actuator.

6. The device as recited in claim 3 wherein the sensor detects parameters concerning weight of the objects.

7. The device as recited in claim 1 wherein the linear actuator is initializable prior to start-up and/or on the fly.

8. The device as recited in claim 1 wherein a following error of the linear actuator is detectable.

9. The device as recited in claim 1 wherein a position of the linear actuator is adjustable during operation.

10. The device as recited in claim 9 wherein the positional adjustment is controllable by a controller, depending on detected sensor values with respect to parameters of the objects depending on weight and/or size.

11. The device as recited in claim 1 wherein the objects comprise beverage containers and/or bottles pushable in the lateral direction from the transport device.

12. A device for removing objects from a conveyor having objects standing in a row thereon, comprising:

a controller;

a sensor connected to the controller for selecting objects to be removed from the conveyor and determining if the objects are soiled or no longer suitable for further processing;

a first removing line and a second removing line; and a position-controlled linear pusher connected to the controller for pushing selected objects in a lateral direction with respect to a direction of travel of the conveyor onto the first and second removing lines as a function of an input from the sensor, the first removing line returning the objects to a cleaning machine if the objects are soiled and the second removing line serving to collect all objects no longer suitable for further processing.

13. The device as recited in claim 12 wherein the first and second removing lines are arranged parallel to the conveyor at the pusher.

14. The device as recited in claim 12 wherein the controller allows presetting of various movement parameters of the linear actuator.

15. The device as recited in claim 12 wherein the controller controls total travel, speed of travel and/or acceleration of the linear actuator.

16. The device as recited in claim 12 wherein the controller varies the movement parameters of the linear actuator during movement of the linear actuator.

17. The device as recited in claim 12 wherein the sensor detects parameters concerning weight of the objects.

18. The device as recited in claim 12 wherein the linear actuator is initializable prior to start-up and/or on the fly.

19. The device as recited in claim 12 wherein a following error of the linear actuator is detectable.

20. The device as recited in claim 12 wherein the objects comprise beverage containers and/or bottles pushable in the lateral direction from the transport device.

* * * * *